United States Patent [19]

Hendricks

[11] 4,258,075
[45] Mar. 24, 1981

[54] CRYOGENIC TARGET FORMATION USING COLD GAS JETS

[75] Inventor: Charles D. Hendricks, Livermore, Calif.

[73] Assignee: The United States of America as represented by the United States Department of Energy, Washington, D.C.

[21] Appl. No.: 84,023

[22] Filed: Oct. 11, 1979

Related U.S. Application Data

[62] Division of Ser. No. 20,121, Mar. 13, 1979, Pat. No. 4,190,016.

[51] Int. Cl.³ .............................................. G21B 1/00
[52] U.S. Cl. ........................................ 427/6; 427/230
[58] Field of Search ............... 176/1; 427/6, 5, 237, 427/230

[56] References Cited

U.S. PATENT DOCUMENTS 4,154,868  5/1979  Woerner ................... 427/6

Primary Examiner—Sam Silverberg
Attorney, Agent, or Firm—L. E. Carnahan; Roger S. Gaither; James E. Denny

[57] ABSTRACT

A method and apparatus using cold gas jets for producing a substantially uniform layer of cryogenic materials on the inner surface of hollow spherical members having one or more layers, such as inertially imploded targets. By vaporizing and quickly refreezing cryogenic materials contained within a hollow spherical member, a uniform layer of the materials is formed on an inner surface of the spherical member. Basically the method involves directing cold gas jets onto a spherical member having one or more layers or shells and containing the cryogenic material, such as a deuterium-tritium (DT) mixture, to freeze the contained material, momentarily heating the spherical member so as to vaporize the contained material, and quickly refreezing the thus vaporized material forming a uniform layer of cryogenic material on an inner surface of the spherical member.

4 Claims, 4 Drawing Figures

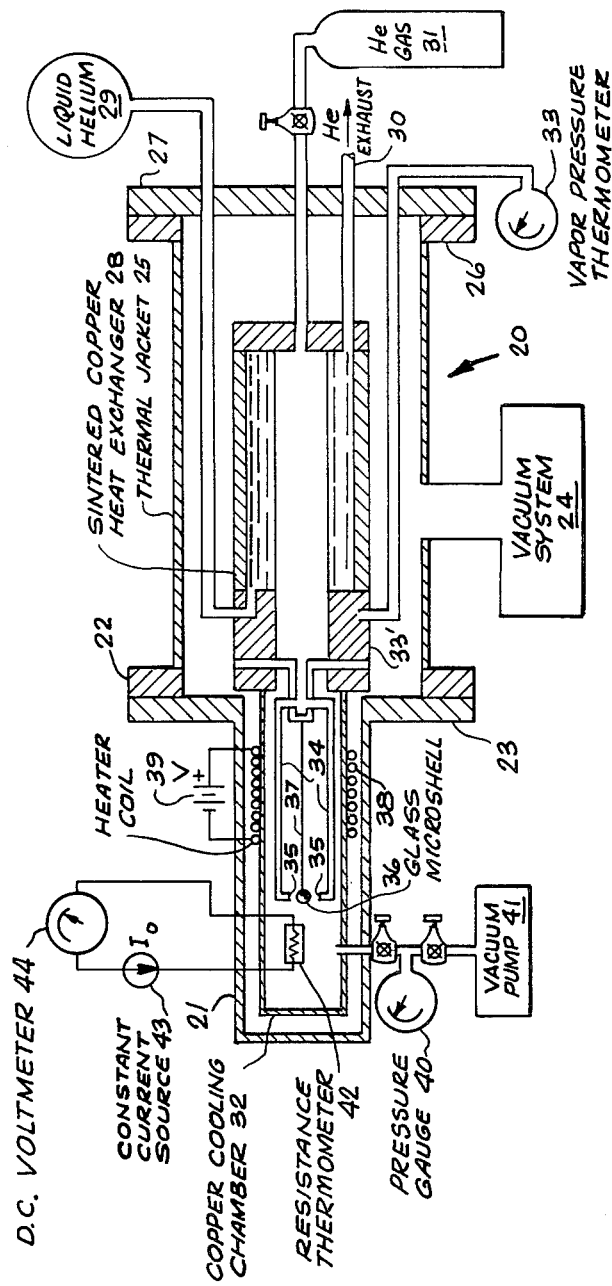

CRYOGENIC TARGET FORMATION USING COLD GAS JETS

This is a division of application Ser. No. 020,121, filed Mar. 13, 1979 now U.S. Pat. No. 4,190,016.

BACKGROUND OF THE INVENTION

The invention described herein was made at the Lawrence Livermore Laboratory, in the course of, or under Contract No. W-7405-ENG-48 between the University of California and the U.S. Department of Energy.

The invention relates to the fabrication of spherical members, such as inertially imploded targets, and more particularly to a method and apparatus utilizing cold gas jets to form a uniform layer of selected material on the inside of a spherical member having one or more layers or shells.

Various types of targets composed of spherical members containing, for example, deuterium-tritium have been proposed. Such targets may consist of either single or multiple shells, for utilization in inertial confinement systems, for example, wherein the targets are imploded by energy from lasers, electron-beams, and ion-beams.

Prior methods for producing these various types of inertial confinement targets are known in the art, as exemplified by U.S. Pat. No. 3,953,617 issued Apr. 27, 1976 in the name of W. H. Smith et al; U.S. Pat. No. 3,985,841 issued Oct. 12, 1976 in the name of R. J. Turnbull et al; U.S. Pat No. 3,987,590 issued Oct. 26, 1976 in the name of R. R. Chianelli; and U.S. Pat. No. 4,021,180 issued May 3, 1977 in the name of J. A. Rinde et al.

Various inertial confinement systems are known in the art for imploding such targets, as exemplified by U.S. Pat. No. 3,723,246 issued Mar. 27, 1973 in the name of M. J. Lubin; U.S. Pat. No. 3,762,922 issued Oct. 2, 1973 in the name of J. C. Hedstrom; U.S. Pat. No. 3,892,970 issued July 1, 1975 in the name of J. R. Freeman et al; and U.S. Pat. No. 3,899,681 issued Aug. 12, 1975 in the name of E. H. Beckner.

Inertial confinement targets have many applications as set forth in the above-referenced U.S. Pat. No. 3,723,246 to M. J. Lubin, such as providing high temperature plasma for use in linear and/or closed plasma research apparatus, such as stellarators, tokamaks, magnetic mirrors, etc. In addition, plasma produced by inertially imploded targets can be used for providing space propulsion, neutron production, physics studies, etc.

The inertial confinement targets thus far experimentally tested have been primarily composed of a hollow glass shell or microsphere filled with fuel such as DT in gaseous, liquid or solid form. The article "Spherical Hydrogen Targets for Laser-Produced Fusion" by I. Lewkowicz, J. Phys. D:Appl. Phys., Vol. 7, 1974, illustrates a method for filling microspheres with such fuel. Targets utilizing a layer or shell of frozen DT have also been developed, see report UCRL-13814 entitled "Separation of Sphere and Shell Laser Fusion Targets" by K. Kim, 1978, pp. 2-54. One of the problems in fabricating such targets is in forming the layer of DT uniformly as non-uniform thickness of the DT layer produces undesirable results.

One of the most favorable targets uses a uniform layer of DT mixture in a glass microsphere, since such reduces the implosion energy required. Methods and apparatus for producing uniform layers of DT within glass shells are exemplified by copending U.S. patent application Ser. No. 872,284 filled Jan. 25, 1978 in the name of J. R. Miller and Applications Ser. No. 924,335 and Ser. No. 924,336, filed July 13, 1978 in the name of R. L. Woerner, each assigned to the assignee of this application. The referenced copending applications utilize a freezing cell to form and hold a uniform DT layer on the inner surface of a target microsphere, wherein the frozen DT is surrounded by cold helium gas in the freezing cell. The frozen DT is momentarily vaporized by either a light pulse or an electrically generated heat pulse, and then quickly refreezes in a uniform layer by the action of the surrounding cold helium gas.

Advanced inertial confinement experiments will utilize complex cryogenic targets with a uniform frozen deuterium-tritium (DT) layer therein. While the above-referenced applications disclose and claim methods and apparatus for effectively forming one or more layers of DT on the inner surface of spherical members composed of single or multiple spaced shells, the complex targets proposed for advanced experiments also involves non-spaced multiple layers or shells. Thus, fabrication techniques are needed to produce the multiple layer or shell complex targets of either opaque or transparent materials as well as the single or multiple-spaced layer or shell targets.

SUMMARY OF THE INVENTION

This invention provides a method and apparatus for producing uniform layers of cryogenic material, such as a mixture of deuterium-tritium, on an inner surface of hollow spherical members, such as a single shell, multiple-spaced shell, or complex shell target.

The present invention, like the above-referenced copending applications, utilizes the basic concept of quickly vaporizing and refreezing the cryogenic material so as to form a uniform layer of such material within the hollow spherical member. This invention, however, utilizes cold gas jets to freeze the cryogenic material and the material is vaporized by applying a short heat pulse directly to the spherical member or in the cold gas jets, whereupon removal of the heat pulse allows the material to refreeze in a uniform layer by the action of the cold gas jets. Basically the invention involves directing at least one jet of cold gas onto the spherical member containing a cryogenic material, applying heat to the cryogenic material sufficient to vaporize same, and refreezing the cryogenic materials to form a substantially uniform layer thereof within the spherical member. The spherical members (targets) may be retained within the apparatus by levitation, wherein the cold gas jets function to hold the member in place as well as to form the uniform layer therein. The invention may be utilized in the fabrication of spherical members, such as targets, having both transparent and opaque materials composing the spherical member.

Therefore it is an object of the invention to provide a method and apparatus for producing a substantially uniform layer of cryogenic material inside a hollow spherical member.

A further object of the invention is to provide a method and apparatus for producing uniform layers of deuterium-tritium on the inner surface of microspheres using cold gas jets.

Another object of the invention is to provide a method and apparatus utilizing cold gas jets to retain by levitation a spherical member to be treated and to cause DT therein to be formed into a uniform layer.

Another object of the invention is to provide a method and apparatus utilizing cold gas jets for uniformly forming a layer of frozen DT on the inner surface of a hollow spherical member to be used as an inertial confinement target composed of at least one layer of opaque or transparent material.

Another object of the invention is to provide a method and apparatus using cold gas jets for uniformly forming a layer of cryogenic material on the inner surface of a spherical member by heating the material to a temperature $\gtrsim$ the liquification point of the material and rapidly recooling the material to a temperature $\lesssim$ the solidification point thereof.

Other objects of the invention will become readily apparent from the following description and accompanying drawings.

BRIEF DESCRIPTION OF THE DRAWINGS

FIG. 2 schematically illustrates an embodiment of the invention with a freeezing cell which employs both exchange gas and gas jets;

DETAILED DESCRIPTION OF THE EMBODIMENTS

The present invention involves a method and apparatus using cold gas jets to form and retain a uniform layer of cryogenic material on the inside surface of a spherical member. The cryogenic material is hereinafter described as being deuterium-tritium (DT) with the spherical member being described as a DT-filled microsphere such as utilized in inertial confinement targets. The microsphere is constructed of one or more shells of opaque or transparent materials, such as glass or glass and neon, for example. The invention is not limited to the specific cryogenic material or to the specific spherical member described or illustrated herein.

Basically, according to the invention, cold gas jets, cooled below the freezing point of DT, are directed at a DT-filled target in a freezing cell to freeze the DT. The target is momentarily heated by a short heat pulse produced, either in the cold gas jets or separately, so the DT is momentarily vaporized. After the heat pulse, the DT refreezes in a uniform layer by the action of the cold gas jets.

Figure 1:
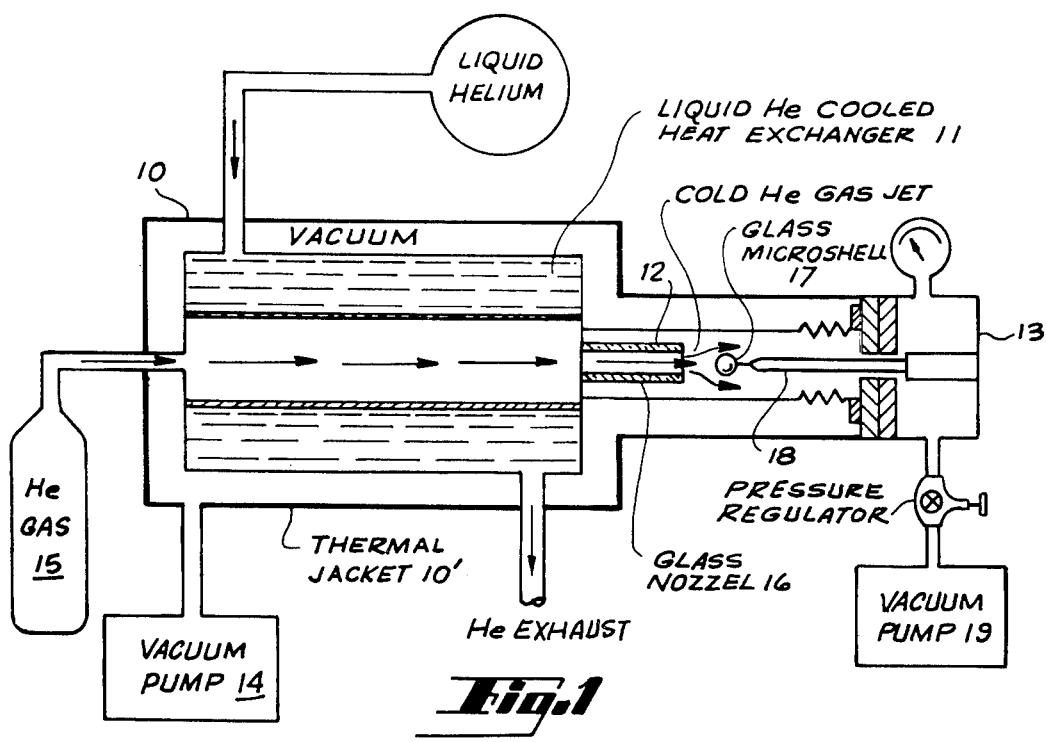
FIG. 1 schematically illustrates an embodiment of a cryogenic target fabrication system utilizing a cold gas jet.

A cryogenic target fabrication system to freeze deuterium gas in a glass microsphere or microshell is shown in FIG. 1, wherein heat exchangers are used to cool helium gas which is directed by a nozzle onto the target as a cold gas jet. To carry out the vaporization step using the FIG. 1 apparatus, the temperature of the gas (normally 5° K. to 10° K.) passing through the nozzle onto the target would be raised to a point sufficient to vaporize the DT within the target. This could be accomplished, for example, by a heating coil (not shown) positioned around the nozzle which is momentarily turned on (time of 0.1 s to 2.0 s) so as to increase the temperature of the gas passing through the nozzle up to the range of 25° K. to 50° K.

The cryogenic target fabrication system of FIG. 1 is basically composed of a housing 10 having a thermal jacket 10' thereabout and having therein a liquid He cooled heat exchanger 11 and a freezing cell 12 defining a chamber therein, and being removably attached to a target holding mechanism generally indicated at 13. The area around heat exchanger 11 and freezing cell 12 is evacuated (to the range of $10^{-3}$ Torr to $10^{-5}$ Torr) as indicated, by a vacuum pump 14. He gas from a pressured source 15 passes through heat exchanger 11 whereby it is cooled to a temperature of 5° K. to 10° K. and discharges through a nozzle 16 onto a DT-filled target 17 supported in freezing cell 12 by a stalk 18 of mechanism 13. Freezing cell 12 is under evacuated conditions (range of $1 \times 10^{-3}$ Torr to $20 \times 10^{-3}$ Torr) via a vacuum 19 of mechanism 13. The He gas from source 15 is cooled to a temperature below the freezing temperature of the DT in target 17 so as to freeze the DT, and flows through nozzle 16.

FIG. 2 illustrates an embodiment of the invention wherein a cryogenic target fabrication system contains a freezing cell which utilizes both a exchange gas and gas jets. Basically, in this embodiment, helium gas is cooled below the freezing point of the DT mixture in the target by heat exchangers. The cold gas is directed onto the target in the freezing cell by several nozzles so the gas jets completely wet the target, thereby freezing the DT. The freezing cell is filled with cold helium exchange gas (temperature of 5° K. to 10° K.) and the gas jets are turned off. The frozen DT is momentarily (time frame of 0.1 s to 2.0 s) vaporized by a heat pulse via a heating coil surrounding the freezing cell or by some other method. Upon termination of the heat pulse, a uniform frozen DT layer is then formed by the cold exchange gas. The cold gas jets are then turned on again to retain the uniform DT layer while the cold exchange gas is removed from the cell.

Referring now to FIG. 2, this embodiment comprises a housing having a heat exchange section generally indicated at 20 and a freezing cell section 21 removably secured to one another by respective flanges 22 and 23, each section being evacuated, for example, to $10^{-6}$ Torr, by vacuum system 24. Heat exchange section 20 consists of a thermal jacket or casing 25 connected at one end to flange 22 and at the opposite end to a flange 26 which in turn is secured to an end plate 27. A heat exchanger 28, such as a sintered copper type, is positioned within housing heat exchanger section 20 and is connected to a liquid helium source 29 and an He exhaust 30, and cools He gas from a source 31 which passes into a cooling chamber 32, constructed of copper, of freezing cell section 21. A vapor pressure thermometer 33 is operatively connected to a vapor pressure thermostat bulb 33' adjacent heat exchanger 28. The cooled He gas (temperature of 5° K. to 10° K.) from heat exchanger 28 is directed through a plurality of annularly positioned tubes 34 (two shown) which terminate in inwardly directed jet nozzles 35. The nozzles 35 may, for example, have a diameter of 0.1 mm to 1 mm. If desired, the tubes 34 can be replaced by a hollow annular sleeve having a plurality of jet nozzles 35 connected at one end thereof. A hollow microsphere or microshell 36 containing DT is supported on a stalk 37 and positioned intermediate jet nozzles 35 such that cold He gas from the nozzles completely wets the microsphere, as above described. An electric heater coil 38 connected to a power supply 39 (voltage of 10 v to 110 v) is wrapped partially around cooling chamber 32, with chamber 32 being evacuated to a desired pressure, such as $1\times10^{-3}$ Torr to $20\times10^{-3}$ Torr, as indicated on gauge 40 by a vaccum pump 41. A germanium resistance thermometer 42 is positioned within chamber 32 and connected to an appropriate constant current source 43 and a D.C. voltmeter 44. As set forth above, with the microsphere 36 positioned as shown, jet nozzles 35 and heater coil 38 function together with cooling chamber 32 to vaporize and uniformly form the DT into a shell or layer within the microsphere. The time required to vaporize and refreeze the DT depends on the size of the microsphere and the volume of DT.

Figure 3:
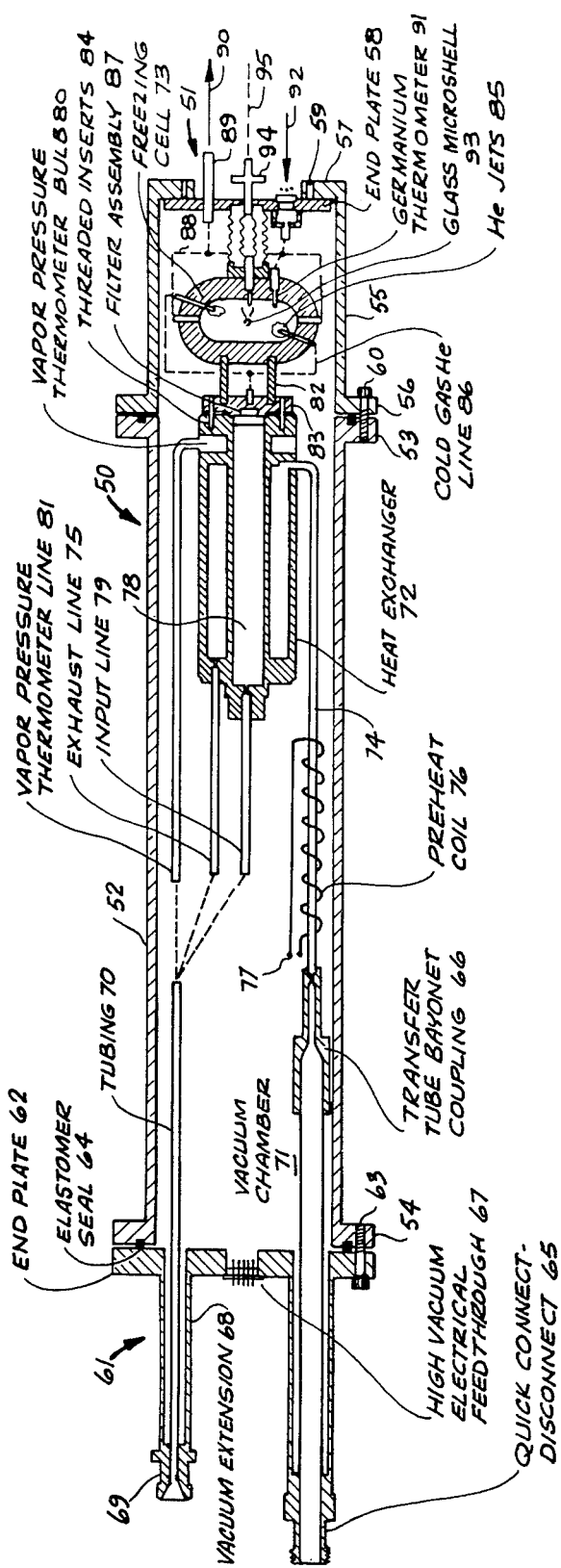
FIG. 3 schematically illustrates another embodiment of the invention with a freezing cell which uses gas jets only.

Another embodiment of the invention is shown in FIG. 3 wherein the cryogenic target fabrication system contains a target freezing cell which employs cold gas jets only, thus differing from the FIG. 2 embodiment. In this embodiment the DT in the target or microsphere is frozen by the cold gas jets, momentarily vaporized by a heat pulse in the gas jets, and then refrozen in a uniform layer by the cold gas jets. The freezing cell is not filled with exchange gas so the cell can be opened up inside an implosion chamber for illumination of the target by laser, electron beam, or other energy sources while the frozen target layer is maintained by the cold gas jets.

The FIG. 3 embodiment comprises a housing having a heat exchange section generally indicated at 50 and a freezing cell section generally indicated at 51. Housing section 50 consists of a casing or sleeve 52 having outwardly extending flanges 53 and 54 at each end. Housing section 51 consists of a casing 55 having an outwardly extending flange 56 at one end and an inwardly extending flange 57 at the opposite end to which an end plate 58, positioned within casing 55, is removably secured as bolts 59. Housing sections 50 and 51 are removably secured together by bolts 60 extending through flanges 53 and 56. Secured to flange 54 of housing section 50 is a vacuum-electrical connector assembly generally indicated at 61 which consists of an end plate 62 removably secured to flange 54 by bolts 63, with an elastomer seal 64 between the flange 54 and end plate 62, a quick connect-disconnect 65 having a transfer tube-bayonet coupling 66 connected thereto which extends through end plate 62 into housing section 50, a high vacuum electrical feedthrough 67 mounted in end plate 62, and a vacuum exterior 68 with a connect-disconnect coupling 69 and having mounted therein a stainless steel tube 70 which extends through end plate 62.

The interior of housing sections 50 and 51 defines a vacuum chamber, indicated at 71, which is connected to a vacuum pump, not shown, but which maintains chamber 71 at $10^{-6}$ Torr, for example. Positioned within chamber 71 is a heat exchanger 72 and a freezing cell 73. Heat exchanger 72 contains, for example, sintered OFHC copper beads and is connected at the outer portion thereof to a liquid helium (He) source, not shown, but having a temperature of 4.2° K., via an inlet line 74 and transfer tube-bayonet coupling 66, and connected to a helium exhaust line 75 through which exhausting He which passes through tubing 70 to an He exhaust. A helium preheat coil 76, connected at 77 to a heating source, such as an electrical power supply, not shown, with voltage of 10 v to 100 v, is wrapped around inlet line 74 to heat the helium flowing into heat exchanger 72 to a temperature of 5° K. to 10° K. A center section 78 of heat exchanger 72 is connected via a helium gas input line 79, which passes through tubing 70, to a pressurized He gas supply, not shown, at room temperature.

A vapor pressure thermometer bulb 80 is positioned about a portion of center section 78 of heat exchanger 72 and is connected via a line 81, which passes through tubing 70, to an externally located vapor pressure thermometer, not shown, to measure the temperature of the helium gas just before it exits the heat exchanger, into the freezing cell.

Freezing cell 73, constructed of copper, for example, is secured to heat exchanger 72 via a pair of support arms 82 and a support member 83 which is secured to heat exchanger 72 by stainless steel threaded inserts 84. A plurality of He jet nozzles 85 (two shown) extending into freezing cell 73 are connected via cold He gas lines 86 which passes through support member 83 to provide fluid communication between the center section 78 of heat exchanger 72 and freezing cell 73, the temperature of the He gas (5° K. to 10° K.) being below the freezing point of DT, for example. A filter assembly 87 is positioned intermediate center section 78 and support member 83 to prevent plugging of the jet nozzles 85 and contamination of the freezing cell 73 by the OFHC copper beads contained in the heat exchanger. Freezing cell 73 is connected via vacuum lines 88, which are connected to a feedthrough tube 89 that passes through end plate 58 and is connected as indicated by arrow 90 to a vacuum pump, not shown and evacuated to $1\times10^{-3}$ Torr to $20\times10^{-3}$ Torr. A germanium thermometer 91 is positioned in freezing cell 73 and is connected via a high vacuum electrical feedthrough 92 in end plate 58 to readout equipment, not shown, to measure the temperature of the freezing cell. A spherical member or target 93, such as a glass microshell, containing cryogenic material, such as DT, is retained within freezing cell 73 by support mechanism generally indicated at 94 which is operatively connected as indicated at 95 to a D.C. motor which, for example, rotates the microshell at 1–10 RPM.

As above described, the DT of the target 93 is frozen by the cold gas jets 85 (temperature of 5° K. to 10° K.), momentarily vaporized (time frame of 0.1 s to 2.0 s and temperature of 25° K. to 50° K.) by a heat pulse via preheat coil 76 which warms the He gas directed through the gas jets to a temperature of 25° K. to 50° K. and then is refrozen (to temperature of 5° K. to 10° K. and time frame of 1 ms to 10 ms) in a uniform layer by the cold gas again passing through two jets at a temperature of 5° K. to 10° K. The target is rotated by D.C. motor indicated by the connection at 95 such that the whole target has even exposure to the cold gas He jets, as well as for a convenient optical inspection of the uniformity of the DT layer over the entire target surface.

Figure 4:
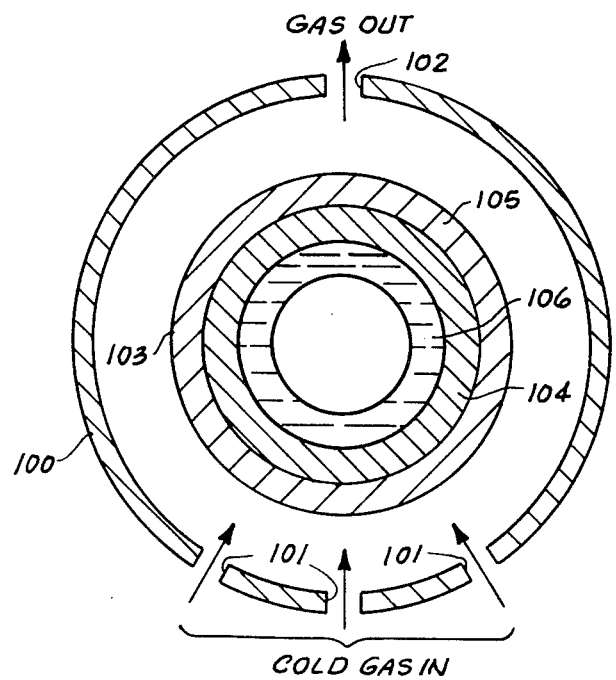
FIG. 4 illustrates an embodiment of the invention wherein cold gas jets are used to levitate the spherical member as well as to cool, liquify, or freeze the cryogenic material therein.

Experiments conducted to verify the above-described embodiments are discussed in above-referenced report UCRL-13814, pages 90–97 and FIGS. 4.1–4.4.

In another embodiment, illustrated in FIG. 4, the cold gas jets are used to levitate the DT containing spherical member as well as to cool, liquify, or freeze the fuel. Helium or other gas is temperature controlled to freeze, vaporize, refreeze and maintain the spherical member at cryogenic temperatures.

Referring now to FIG. 4, the system includes an outer shell or container 100 defining a chamber therein having a plurality of apertures or openings 101 on a side thereof and a single opening or aperture 102 on the opposite side. Openings 101 constitute jet nozzles through which cold gas, such as He, from a source not shown but similar to the FIGS. 2 and 3 embodiments, passes as indicated by arrows and is directed onto a multilayered spherical member 103. The spherical member 103 is levitated within outer shell 100 by the cold gas directed through openings 101 and exhausting via opening 102, as indicated by the arrows. The multilayered spherical member 103 is composed, for example, of a glass microsphere 104 having a shell or layer 105 of neon on the outer surface and a layer or shell 106 of cryogenic material, such as DT, on the inner surface. For example, the glass microsphere 104 may have an inner diameter of 100 $\mu$m to 2000 $\mu$m and a wall thickness of 0.5 $\mu$m to 50 $\mu$m, the outer neon layer 105 having a wall thickness of 10 $\mu$m to 50 $\mu$m, and the inner layer 106 having a wall thickness of 1 $\mu$m to 50 $\mu$m. It is recognized that the outer layer 105 may be omitted without adverse effects on the levitating and layer forming operation of the FIG. 4 embodiment. The cold gas injected through openings 101 is temperature controlled, as in the FIG. 3 embodiment, to freeze, vaporize, refreeze and maintain the DT 106 so that a uniform layer or shell is formed within the glass microsphere 104. For example, the gas passing through the openings 101 is at a temperature of 5° K. to 10° K. to cool the spherical member 103; the temperature of the gas being thereafter raised to from 25° K. to 50° K. causing vaporization of the material 106 within shell 104, followed by lowering the temperature of the gas to from 5° K. to 10° K. causing freezing of the material 106 into a uniform layer within the spherical member. The cold gas is directed, for example, through openings 101 at a pressure and at a flow rate to support, maintain, and cool the spherical member 103. While three (3) openings 101 are illustrated, additional inlet and exhaust openings may be used, the number and location thereof being dependent on the size of the spherial member as well as the gas pressure and flow rate required to maintain the spherical member 103 levitated within container 100 and to produce uniform cooling and vaporization of the material 106.

It has thus been shown that the present invention provides a method and apparatus utilizing cold gas jets for forming at least one uniform layer or shell of cryogenic material inside at least one hollow spherical member. The spherical member may be composed of one or more layers of opaque or transparent materials, the layers being either spaced from one another or positioned substantially contiguously with respect to one another.

While particular embodiments and examples have been illustrated or described, modifications and changes will become apparent to those skilled in the art, and it is intended to cover in the appended claims all such modifications and changes as come within the spirit and scope of the invention.

What is claimed is:

1. A method for forming at least one substantially uniform layer of cryogenic materials on an inner surface of at least one hollow spherical member comprising the steps of: directing jets of cold gas onto the spherical member, the cold gas having a temperature below the solidification point of the cryogenic materials; applying heat to the cryogenic materials by heating the jets of gas, directed onto the spherical member, to a temperature which allows vaporization of the cryogenic material; and refreezing the cryogenic materials to form a substantially uniform frozen layer thereof within the spherical member by lowering the temperature of said gas.

2. The method defined in claim 1, additionally including the step of levitating the spherical member within a container by the jets of cold gas directed onto the spherical member.

3. The method defined in claim 1, wherein the steps of applying heat to the cryogenic materials and refreezing the cryogenic materials is carried out by directing a gas through a plurality of jet nozzles onto the spherical member, and controlling the temperature of the gas.

4. The method defined in claim 3, wherein the step of controlling the temperature of the gas is carried out by passing the gas through a heat exchanger and controlling the temperature of the heat exchanger.

* * * * *